May 22, 1951 L. B. CHAMBERS 2,554,324

PIEZOELECTRIC DEVICE OF AMMONIUM PENTABORATE CRYSTAL

Filed Sept. 3, 1949

*INVENTOR.*
LAWRENCE B. CHAMBERS
*BY*
Harris A. Munns Jr.
ATTORNEY

Patented May 22, 1951

2,554,324

UNITED STATES PATENT OFFICE 2,554,324

PIEZOELECTRIC DEVICE OF AMMONIUM PENTABORATE CRYSTAL

Lawrence B. Chambers, East Cleveland, Ohio, assignor to The Brush Development Company, Cleveland, Ohio, a corporation of Ohio Application September 3, 1949, Serial No. 113,935

14 Claims. (Cl. 171—327)

Figure 1:
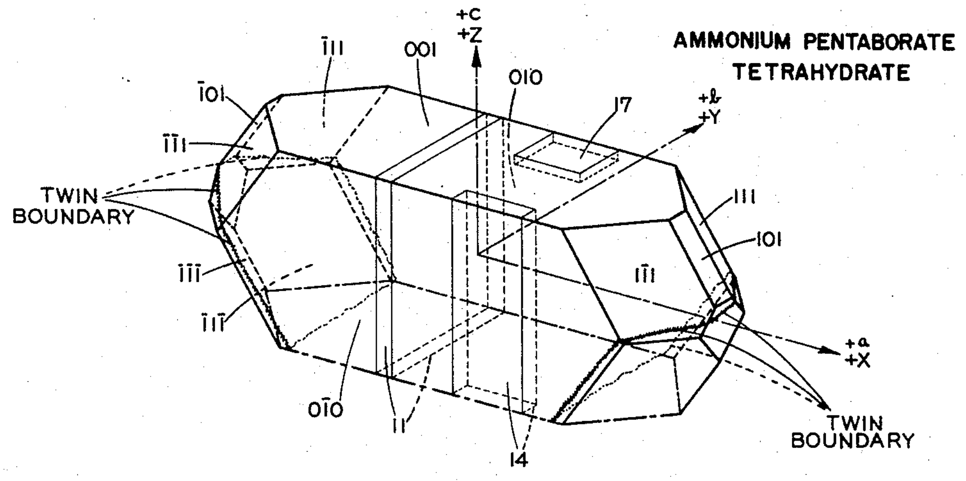

This invention relates to piezoelectric devices, and more particularly to such a device comprising a piezoelectrically sensitive section cut from a single crystal of a type of material heretofore unknown in the piezoelectric art.

As is well known, every crystal must belong to one of the thirty-two possible crystal symmetry classes. One of these classes is known as the hemimorphic or pyramidal class of the orthorhombic system, also designated class $C_{2v}$. A number of crystalline substances were known to the prior art to belong to class $C_{2v}$; notable among these substances is hemimorphite (calamine). However, these substances, including hemimorphite, seem to be of no practical importance in the piezoelectric art, although small piezoelectric responses might be excited in one or two of these substances.

One such response, which is not prohibited by theoretical considerations in crystal substances belonging to class $C_{2v}$, involves a thickness-controlled shear mode of motion. It has been determined that a plate suitably cut from a crystalline material of the class $C_{2v}$ may exhibit a piezoelectric response in regard to such a thickness-controlled shear mode, and that such a thickness-shear mode response is free of undesired coupling to other modes of motion. Piezoelectric thickness-controlled shear crystal plates of this type are described and claimed in the copending application Serial No. 20,173, filed April 10, 1948, in the name of Hans G. Baerwald and assigned to the same assignee as the present invention which issued on October 18, 1949 as Patent No. 2,485,130. Generally speaking, however, none of the substances known to the art as belonging to the crystal class $C_{2v}$ could be obtained in single-crystalline plates of a convenient size and chemical stability and with a piezoelectric response of a commercially significant magnitude.

Early crystallographic work on certain crystal substances, known specifically as potassium pentaborate tetrahydrate and as ammonium pentaborate tetrahydrate, indicated that these crystals belong to a crystal class in which piezoelectricity does not occur. More recent work, limited to investigation of the substance known as potassium pentaborate tetrahydrate, indicated that the earlier work was in error as to the last-mentioned substance, and that this substance in fact belongs to class $C_{2v}$. This more recent work also indicated that the hydrogen atoms present in the potassium salt are more closely bound in the crystal lattice than is indicated by the tetrahydrate formula; it appears from this work that the true structure is represented more accurately by the formula potassium dihydrogen dihydronium pentaborate. This more recent work, however, does not mention piezoelectricity and makes no reference whatever to ammonium pentaborate tetrahydrate, concerning which no piezoelectric data are believed to have been obtained prior to the work leading to the present invention. In fact, it may be presumed from the work done prior to the present invention that the ammonium salt does not belong to the crystal class $C_{2v}$, since this was the conclusion drawn in the early work mentioned hereinabove. It should be noted that it has not been found possible to predict the magnitude of any piezoelectric responses in a given substance even though the substance under consideration belongs to one of the so-called piezoelectric crystal classes, and such magnitude may be substantially zero or entirely negligible in any particular case. Hence the piezoelectric properties of the ammonium salt were unknown to the prior art, regardless of the crystal class to which it might belong.

Work done by another investigator, still more recently, has led to the discovery that potassium pentaborate has unexpected and very substantial piezoelectric response characteristics. This subject matter is described in the concurrently filed application Serial No. 113,929, filed in the name of Hans Jaffe and assigned to the same assignee as the present invention. The subject matter of this copending application relates to a piezoelectric device comprising an electroded section cut from a single crystal of a composition selected from the group consisting of potassium pentaborate tetrahydrate, rubidium pentaborate tetrahydrate, and isomorphic mixtures of potassium and rubidium pentaborate hydrates. Prior to the work leading to the present invention, however, there was no indication that the substance known as ammonium pentaborate tetrahydrate could be considered as being classed with the aforementioned potassium or rubidium salts or as having any useful or measurable piezoelectric responses.

Accordingly, it is an object of the present invention to provide a novel and useful piezoelectric device comprising a section cut from a single crystal of a material having substantial piezoelectric response characteristics.

It is another object of the invention to provide a piezoelectric device comprising a section cut from a substance having useful and heretofore unknown crystallographic and piezoelectric properties.

It is a further object of the invention to provide a new and improved piezoelectric device comprising a section cut from a single crystal of a substance of the hemimorphic orthorhombic crystal class and which has a strong piezoelectric response in a mode of motion associated with one of the possible piezoelectric response coefficients peculiar to this crystal class.

It is a further object of the invention to provide a new and improved piezoelectric device comprising a synthetic crystal plate having a high piezoelectric response in a thickness-shear mode.

It is still another object of the invention to provide a piezoelectric device comprising a piezoelectrically sensitive resonator section cut from a novel piezoelectric material and having a usefully low frequency-temperature coefficient.

In accordance with the invention, a piezoelectric device comprises a piezoelectrically sensitive section having electroded major surfaces cut from a single crystal isomorphic with, and containing at least a substantial portion of, ammonium pentaborate tetrahydrate. The term "electroded surface" is used in this specification and in the appended claims is intended to include an electrode arranged so as to be spaced by an air gap from the crystal surface and closely capacitively coupled thereto, as frequently practiced in the piezoelectric art.

For a better understanding of the present invention, together with other and further objects thereof, reference is had to the following description taken in connection with the accompanying drawing, and its scope will be pointed out in the appended claims.

Figure 3:
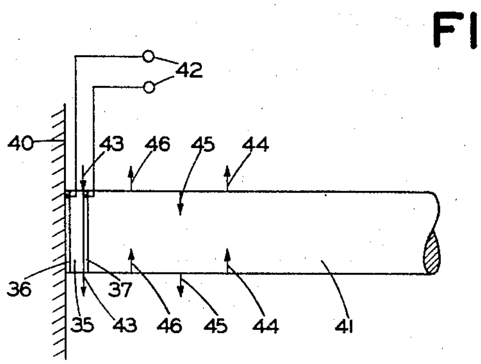
Figure 2:
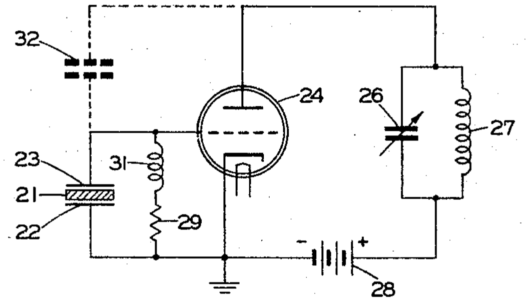
Figures 4, 5:
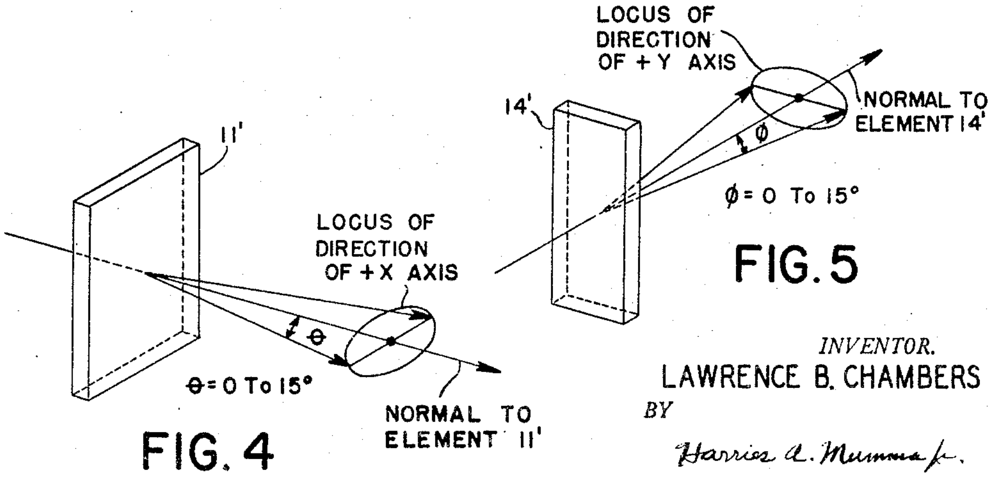

In the drawing, Fig. 1 is a perspective view of a typical single crystal of ammonium pentaborate tetrahydrate, or of a single crystal isomorphic with, and containing at least a substantial portion of, ammonium pentaborate tetrahydrate, which is useful in a piezoelectric device in accordance with the invention;

Fig. 2 is a schematic circuit diagram representing an oscillator which includes a resonator section cut from the crystal of Fig. 1;

Fig. 3 is a view, partly schematic, of a transducer device comprising a similar piezoelectrically sensitive section; and Figs. 4 and 5 are views, in the same perspective as that of Fig. 1, representing in a schematic fashion the permissible ranges of crystallographic orientations for two types of piezoelectric sections which may be cut from the crystal of Fig. 1 and incorporated in piezoelectric devices in accordance with the invention.

Referring to Fig. 1, there is represented in perspective a single crystal isomorphic with, and containing at least a substantial portion of, ammonium pentaborate tetrahydrate. While any isomorphic crystalline substance containing at least a substantial portion of ammonium pentaborate tetrahydrate may have the external structure and development illustrated by way of example in Fig. 1, a crystal habit generally similar to that represented in Fig. 1 may be expected with a crystal substance made up for the most part of ammonium pentaborate tetrahydrate, and the crystal habit illustrated in Fig. 1 is particularly common with the ammonium pentaborate tetrahydrate compound itself.

I have discovered that this ammonium salt forms crystals of the crystal class $C_{2v}$ and is isomorphic with the potassium pentaborate and rubidium pentaborate salts which are discussed in the aforementioned copending application of Hans Jaffe. Accordingly, a single crystal isomorphic with ammonium pentaborate tetrahydrate and containing a substantial portion of the ammonium salt may be an isomorphic mixture, or so-called mixed crystal of ammonium pentaborate tetrahydrate and of potassium or rubidium pentaborate tetrahydrate or both. Small proportions of one or both of the latter salts in the mixed crystal can be expected to result in useful modifications of the piezoelectric properties of the crystal material.

Single crystals of the ammonium pentaborate tetrahydrate type, illustrated in Fig. 1, seem to be more readily grown in a clear and unflawed condition than are crystals of the potassium salt. The ammonium salt may be grown by slow cooling of a saturated aqueous solution, preferably while subjecting the tank containing the solution and seeds of the crystalline material to a rocking motion. The habit of the ammonium pentaborate crystal tends toward elongation of the crystal in the direction of the crystallographic *a*-axis, the axes being designated as mentioned hereinbelow. This habit differs somewhat from that of potassium pentaborate crystals, and favors the cutting of most of the useful piezoelectric crystal sections in conveniently large size and number from a single crystal of ammonium pentaborate tetrahydrate.

While these pentaborate compositions are referred to herein as tetrahydrates, it will be understood that the compounds intended to be designated are those commonly identified as tetrahydrates and given the formula $MB_5O_8 \cdot 4H_2O$, wherein M is the ammonium ion, which may be replaced in part by the metal, such as potassium, rubidium, or thallium, of an isomorphous pentaborate salt. Reasonable quantities of other suitable compounds also may be present in a single crystal isomorphic with, and containing at least a substantial portion of, ammonium pentaborate tetrahydrate. As to the pentaborate tetrahydrates referred to hereinabove, some or all of the water of hydration apparently is bound more closely within the pentaborate molecule, so that the formula more accurately might be written $MH_2(H_3O)_2B_5O_{10}$, an acid dihydronium pentaborate. For convenience the designated compounds will be referred to in this specification and in the appended claims as pentaborate tetrahydrates, and, regarding specifically the ammonium salt, this compound will be referred to as ammonium pentaborate tetrahydrate, although a more accurate designation therefor might be ammonium dihydrogen dihydronium pentaborate.

Pentaborate crystals of the type with which the present invention is concerned are represented in Fig. 1 with relation to crystallographic axes *a*, *b*, and *c*. These three crystallographic axes are made to coincide in the conventional manner with the respective coordinate axes X, Y, and Z of a right-handed system of rectangular coordinates. The positive directions of the crystallographic and coordinate axes are represented by arrows. Crystallographic indices of the important crystal faces are designated in Fig. 1 in the conventional manner.

The significance of the crystallographic axes *a*, *b*, and *c* is discussed in the aforementioned concurrently filed application of Hans Jaffe with reference to certain isomorphous pentaborate compounds. The same conventions are used herein, and, in accordance with accepted practice, the two-fold rotational axis present in class $C_{2v}$ is chosen as the *c*-axis while the *a*- and *b*-axes are perpendicular to the two symmetry planes.

Identification of the directions of the crystallographic and coordinate axes in a single crystal specimen of ammonium pentaborate may be facilitated by reference to the general location, size, and relationship of the faces, as shown in Fig. 1 for a typical crystal.

Twinning tends to develop during the growth of ammonium pentaborate crystals. The typical crystal illustrated in Fig. 1 has small twinned portions at each end of the crystal, and the twin boundaries are represented by wavy lines. The twinning plane is 101 in terms of the crystallographic axes described hereinabove.

On a piece of ammonium pentaborate crystal, which may not have well developed faces, the crystallographic *a*-, *b*-, and *c*-axes are readily identified by means of polarized light. The two optic axes are found to lie in the plane perpendicular to the *a*-axis, while the *b*-axis is the bisectrix of the acute angle between the optic axes.

The single crystals from which the piezoelectrically sensitive sections of the device of the present invention are obtained show pronounced cleavages not only along YZ-planes, which also may be designated as 100 planes, but also along XZ-planes, which also may be designated as 010 planes. A section or plate cut from this substance and having two major surfaces parallel to each other and lying in 100 planes is an X-cut section. The production of X-cut plates is greatly facilitated by the fact that their major surfaces lie on cleavage planes. Likewise the production of Y-cut sections is facilitated for this material by the fact that their major surfaces lie in 010 planes, along which at least as pronounced a cleavage is found.

In the view of Fig. 1 there may be seen the outlines of three piezoelectrically sensitive sections which may be cut from the single crystal. One of these sections is an X-cut section 11. As shown in Fig. 1, the edges of this rather thin section 11 actually are narrow portions of the 010 and 001 faces, so that these edges extend in the Y- and Z-directions. Thus the X-cut section 11 is rectangular in shape, and also is somewhat longer along the Z-axis than along the Y-axis. The section 11 may be taken from the single crystal by suitable cutting or cleaving and finishing operations. Of course, other X-cut sections parallel to the section 11 and of the same or different shape may be cut from the same single crystal. It will be clear that the section 11 may be subdivided or cut into one or more smaller sections of any desired shape, for example, a shape having edges parallel to the edges of the section 11.

There also is shown in Fig. 1 the outlines of a Y-cut section 14, one major face of which lies in a natural face of the single crystal. The Y-cut section 14 is thin, and its longer edges extend in the Z-direction while its shorter edges extend in the X-direction. The section 14 may be a portion of a larger Y-cut plate removed from the single crystal of Fig. 1 in any convenient manner. As with the X-cut section 11, other Y-cut sections similar to section 14 or of different shape may be cut from the same crystal.

Still another section 17 is shown in Fig. 1 in outline. Section 17 is a Z-cut plate, one major face of which lies in a natural face of the single crystal illustrated. The Z-cut section 17 shown in Fig. 1 is a thin rectangular section with its edges extending in the X-direction and in the Y-direction, the length in the X-direction being somewhat larger than the width in the Y-direction. Other Z-cut sections of the same or different shape may be cut, of course, from the same single crystal.

A suitable section, such as any of the sections 11, 14, and 17 shown in outline in Fig. 1, advantageously may be incorporated as a resonator element in a frequency-selective piezoelectric device. While such a frequency-selective device may take the form of a crystal filter, it will be convenient to describe herein a frequency-selective oscillator device. Numerous oscillator circuits are known to the art, and the choice of a particular circuit and of the parameters of the components of such circuit depends upon the characteristics of the particular crystal sections to be used and upon the frequency of operation. This choice of the circuit elements is a matter of more or less routine design practice. For purposes of illustration, however, there is described hereinbelow an oscillator device in the form of a modified tuned-plate tuned-grid circuit, since this type of circuit is conventional and fairly dependable in operation.

Fig. 2 represents a piezoelectric device comprising a piezoelectrically sensitive resonator section 21 having electroded major surfaces 22 and 23, which are illustrated schematically. The electrodes or electroded surfaces 22 and 23 may be provided on the faces of the crystal section in any convenient manner. For example, various methods of applying thin coatings, deposits, or layers of metal or other conductive material are well known. Alternatively, a crystal holder may be used which provides an air gap between the electrode and the crystal surface. The piezoelectrically sensitive section 21 may be any such section cut from the single crystal of Fig. 1, and more specifically the section 21 may take the form of any one of the sections 11, 14, and 17 illustrated in outline in Fig. 1.

The remainder of the device of Fig. 2 comprises electrical oscillatory means for exciting the resonator section 21 so as to utilize the frequency-selective characteristics thereof. This oscillatory circuit is a crystal-controlled circuit having a triode vacuum tube 24. The circuit includes a variable capacitor 26 suitable for resonating a parallel inductor 27. The parallel resonant circuit 26, 27 is connected across the anode-cathode circuit of the triode 24 with a source of anode potential 28 inserted between the resonant circuit and the grounded cathode of the triode. The grid circuit comprises essentially the crystal resonator 21, the electrodes 22 and 23 of which are connected to the cathode and control electrode respectively of the triode 24. The crystal element 21 is shunted by a resistor 29 and a series choke inductor 31 to provide a suitable bias voltage. A capacitor 32 may be connected between the anode and control electrodes of the triode 24, but this capacitor is shown in dotted lines because the interelectrode capacitance of the triode ordinarily supplies the desired coupling between these electrodes.

In the operation of the circuit of Fig. 2, the capacitor 26 may be adjusted so that the circuit 26, 27 resonates at a frequency which is at or near the frequency of a natural resonance of the crystal section 21. Any excitation in the anode-cathode circuit of the triode 24 tends to produce oscillations at the frequency of resonance of the tuned circuit 26, 27. The resulting oscillatory voltage appears across the capacitance 32 and the impedance of the crystal element 21, and stabilizes at such a frequency that it is applied regeneratively to the control-electrode circuit of the triode. This tends to set up oscillations, the frequency of which is determined in a well known manner by the steep impedance-frequency characteristic of the crystal element 21.

The X-cut crystal section 11 is adapted particularly well to be incorporated in the device of Fig. 2 as the resonator section 21. When so incorporated the X-cut section may be excited in a thickness-shear mode of motion so as to utilize the frequency-selective characteristics of that mode of motion of the crystal section. While the section 21 may be cut in this way from a single crystal isomorphic with ammonium pentaborate tetrahydrate and containing in addition other substances, it is preferred that the crystal section be cut from a single crystal of ammonium pentaborate tetrahydrate. Whether or not the single crystal is the pure ammonium salt or is a mixed crystal containing reasonable amounts of another substance or substances, an X-cut section is piezoelectrically sensitive to a thickness-shear mode of motion of the crystal section. In practice, a section which has a pair of electroded surfaces with the normal to the plane of each of these surfaces inclined not more than 15° from the X-axis of the crystalline substance is sensitive in a thickness-shear mode, since it may be said to be designed for operation with an electric field in the general direction of the X-axis. The orientation of such an inclined or modified X-cut section is illustrated in Fig. 4, as discussed hereinbelow. Preferably a true X-cut section with major surfaces substantially coinciding with the X-axis of the crystalline substance is chosen, since the major surfaces then are cut substantially along natural cleavage planes. When such an X-cut section has its thickness dimension, parallel to the X-axis direction, much smaller than its length dimension, parallel to the Z-axis, the natural frequency of a thickness-shear mode of motion of the section is determined by the thickness dimension. The symmetry of this material is such that an electric field applied in the X-direction produces a shear in the plane perpendicular to the Y-axis, that is, the XZ-plane. The width dimension, parallel to the Y-axis, may be chosen to provide a desirable capacitance for the electroded section. Modifications of the frequency constant or changes in the frequency-temperature characteristics may be effected by cutting or grinding the major surfaces of the crystal section so that the normal to each surface is inclined somewhat from the X-axis of the crystalline substance, but, as indicated hereinabove, inclinations of more than 15° from the X-axis may be expected to cause serious deterioration of the desired piezoelectric response.

The thickness-shear response of X-cut sections is not the only useful piezoelectric response obtainable with single crystals isomorphic with, and containing at least a substantial portion of, ammonium pentaborate tetrahydrate. For example, the capabilities of the ammonium salt may be seen from the following approximate values of the piezoelectric coefficients in units of $10^{-12}$ meters per volt:

| | |
|---|---|
| $d_{15}$ | 13.0 |
| $d_{24}$ | 6.7 |
| $d_{31}$ | −6.6 |
| $d_{32}$ | −1.9 |
| $d_{33}$ | 6.9 |

The piezoelectric coupling coefficients are given by these piezoelectric coefficients in conjunction with dielectric and elastic data. The coupling coefficient for the X-cut thickness-shear section is high, and resonances are strongly excited. An X-cut thickness-shear section exhibits a frequency constant of about 1620 kc.-mm. at about 26° C., and either increase or decrease of temperature causes the frequency constant to decrease to the extent that the frequency is decreased by 0.1% at about +10° C. and at about +44° C.

It may be pointed out here that ammonium pentaborate tetrahydrate is chemically stable to a temperature above 100° C., although it is well to protect the crystal from contact with the atmosphere.

The high value of the $d_{15}$ piezoelectric coefficient is responsible in part for the strong response of the X-cut section in the thickness-shear mode. Morever, the value given above for the $d_{24}$ coefficient makes possible the excitation of thickness-shear responses with Y-cut plates. I have discovered that such substantial and useful responses in fact exist. Thus, a field applied in the Y-direction produces a shear in the plane perpendicular to the X-axis, that is, the YZ-plane. Accordingly the section 14, having its length dimension parallel to the X-axis, is piezoelectrically sensitive to a thickness-shear mode of motion at a natural frequency which is determined by the thickness dimension when the latter dimension is much smaller than the length dimension. As with the X-cut section 11, the normal to the plane of each of the electroded surfaces of the Y-cut section 14 may be inclined not more than 15° from the Y-axis for operation with an electric field in the general direction of the Y-axis, whereby the electroded section remains piezoelectrically sensitive to a thickness-shear mode of motion. The orientation of such an inclined or modified Y-cut section is illustrated in Fig. 5, as discussed hereinbelow. Preferably, however, the normal to the plane of each of the major surfaces of the Y-cut section substantially coincides with the Y-axis so as to be cut substantially along certain of the natural cleavage planes mentioned hereinabove.

By choosing the major surfaces of a crystal plate practically perpendicular to either the X-axis or the Y-axis, the resulting cuts have the particular advantage of being substantially free of elastic cross-coupling between the desired thickness-shear mode and other modes of motion, as set forth in the above-mentioned copending application of Hans G. Baerwald.

The orientations of crystal elements deviating not more than 15° from the X-cut and Y-cut elements 11 and 14 respectively, shown in Fig. 1, are represented in Figs. 4 and 5 respectively. Fig. 4 represents a crystal section 11′ inclined from the section 11 of Fig. 1 by an angle $\theta$. The section 11′ is shown in the same perspective in Fig. 4 as is the X-cut section 11 in Fig. 1. The direction of the normal to the major surfaces of the element 11′ and the direction of the X-axis are designated by arrows in Fig. 4. It will be seen that the locus of the X-direction forms a cone with the aforesaid normal as the axis of the cone. The angle $\theta$ between the normal and the X-axis may lie between 0° and 15°, this angle being 0°, of course, for a true X-cut section. It will be clear that, if the various major surfaces and edge surfaces of the section 11′ are at right angles to each other as is the case with the section 11 of Fig. 1, the edge faces and the edges of the section 11′ in general no longer will be parallel to the several crystallographic axes when the angle $\theta$ is greater than 0°.

The representation of a modified Y-cut section 14′ in Fig. 5 is quite analogous to that of the modified X-cut plate 11′ in Fig. 4. The section 14′ is shown in the same perspective in Fig. 5 as is the Y-cut section 14 in Fig. 1. Again the directions of the normal to the section 14′ and of the +Y-axis are represented by arrows in Fig. 5. The angle between these directions is designed $\phi$. The locus of the Y-direction then forms a cone with the normal to the element 14′ as the axis of the cone. The angle $\phi$ between the normal and the Y-axis may lie between 0° and 15°, this angle being 0°, of course, for a true Y-cut section.

Referring to the piezoelectric coefficients listed hereinabove, it will be noted that basic piezoelectric effects exist such that substantial piezoelectric response characteristics might be encountered with crystal sections cut and electroded so that the electric field appears with a substantial component in the direction of the Z-axis. A section or plate of ammonium pentaborate tetrahydrate which has a pair of electroded major surfaces with the normal to the plane of each of these surfaces substantially coinciding with the Z-axis of the crystalline substance was found to exhibit a moderately strong piezoelectric response in a thickness-expander mode, this response being attributable to the $d_{33}$ coefficient. Such a thickness-expander resonance of a Z-cut section has not been observed with potassium pentaborate tetrahydrate, presumably due to elastic coupling with modes of motion having effects which tend to cancel the response in the thickness-expander mode. The thickness-expander resonance of the Z-cut ammonium pentaborate tetrahydrate plate is moderately strong and has a frequency constant of about 1630 kc.-mm.

Fig. 3 is a partially schematic representation of a piezoelectric device for transducing between the types of energy which are classified as electrical and mechanical. Such a device may be used for transducing from electrical energy to mechanical energy, or vice versa. This device includes a piezoelectrically sensitive section 35 cut from a single crystal isomorphic with, and containing at least a substantial portion of, ammonium pentaborate tetrahydrate. The two major surfaces of the section 35 carry, firmly affixed thereto, electrodes 36 and 37. The section 35 should have a thickness-shear piezoelectric response, and thus may be a crystal plate cut and electroded to provide an electric field in the general direction of either the X-axis or the Y-axis. Thus either the X-cut section 11 or the Y-cut section 14, seen in outline in Fig. 1, is suitable. As viewed in Fig. 3 whether the section 35 is an X-cut plate or a Y-cut plate, the front edge, aligned vertically in the drawing, extends in the Z-direction. In other words, the edge surface of the section 35 as seen in Fig. 3 lies in an XZ-plane for an X-cut plate or in a YZ-plane for a Y-cut plate. The electroded surface 36 of the section 35 is fastened securely to a supporting surface 40. The other electroded surface 37 of the section 35 is fastened securely to a solid rod 41, only the left hand end portion of which is shown in the drawing. A pair of terminals 42 is connected to the individual electrodes 36 and 37.

The arrangement of Fig. 3 may be used for transducing from electrical to mechanical energy by connecting to the terminals 42 the output circuit of an electrical signal generator, for example an ultrasonic frequency signal generator. The resulting electrical field developed in the thickness direction of the crystal plate causes shear distortions within the section 35. Such a distortion at a given instant appears as a downward motion of the unmounted or right hand face of the section 35, as represented in Fig. 3 by the arrows 43. These shear motions alternate upward and downward as seen in Fig. 3 and propagate to the right along the rod 41. There also appear in Fig. 3 several additional sets of arrows 44, 45, and 46, representing for the given instant the positions of regions of maximum deformation in upward and downward directions due to motion of the element 35 previous to that represented by the arrows 43. These additional sets of arrows, of course, are spaced one half wave length apart along the rod, the wave length being determined by the velocity of propagation of ultrasonic energy along the rod 41. Thus the terminals 42 and the electrical circuit apparatus connected thereto, together with the electrodes 36 and 37 and the interconnecting wires, constitute means for applying to the crystal section 35 energy of one of the two types mentioned hereinabove, in this case electrical energy. The mounting surface 40, the rod 41, and the arrangement fastening the section 35 between the surface 40 and the rod 41 constitute means dependent upon the effect of the applied energy upon the crystal section 35 for deriving and utilizing energy of the other type, that is, mechanical energy. This mechanical energy is derived in the form of shear deformations propagating along the rod 41 as described above, and the propagation of the ultrasonic energy along the rod 41 is a utilization of the mechanical energy so derived. The ultimate utilization of the mechanical energy may be the testing of the rod 41 for flaws. The energy propagated along the rod 41 may be reflected from the distant right hand end of the rod, not shown, and thus returned to the left hand end after the round trip time of propagation of the energy along the rod has elapsed. For this purpose the vibrational energy should be developed in the rod 41 in short pulses of ultrasonic frequency energy, which can be generated in a well-known manner. If reflected pulses appear at the left end of the rod before this round trip period of time has elapsed, a structural flaw in the rod is indicated. In another application of the Fig. 3 device the rod 41, of predetermined length and elastic properties, may be used as a mechanical delay line for storing energy during the period of time required for round trip propagation of shear vibrations along the rod. It is noted that the mechanical energy transduced in the device is associated with motion of the crystal section 35 in a thickness-shear mode.

In the utilizations just discussed of the piezoelectric device of Fig. 3, it was implied that shear vibrations propagating in the leftward direction along the rod 41 may be picked up by the element. In this case the rod 41 and its mechanical connection to the mounted crystal section constitute means for applying mechanical energy to the section, wherein this energy is transduced to electrical signal energy. Suitable electrical receiving and display devices, well known in the art, may be connected across the terminals 42, in which case such devices, the electrodes 36 and 37, and the interconnecting wiring constitute means dependent upon the effect of the applied mechanical energy for deriving and utilizing electrical energy.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A piezoelectric device comprising: a piezoelectrically sensitive section having electroded major surfaces cut from a single crystal isomorphic with, and containing at least a substantial portion of, ammonium pentaborate tetrahydrate.

2. A piezoelectric device comprising: a piezoelectrically sensitive section having electroded major surfaces cut from a single crystal of ammonium pentaborate tetrahydrate.

3. A piezoelectric device comprising: a section having electroded major surfaces, cut from a single crystal isomorphic with, and containing at least a substantial portion of, ammonium pentaborate tetrahydrate, and piezoelectrically sensitive to a thickness-shear mode of motion of said crystal section.

4. A piezoelectric device comprising: a piezoelectrically sensitive section, cut from a single crystal isomorphic with, and containing at least a substantial portion of, ammonium pentaborate tetrahydrate, and which has a pair of electroded surfaces with the normal to the plane of each of said surfaces inclined not more than 15° from the X-axis of the crystalline substance.

5. A piezoelectric device comprising: a section, cut from a single crystal isomorphic with, and containing at least a substantial portion of, ammonium pentaborate tetrahydrate, and which has a pair of electroded surfaces with the normal to the plane of each of said surfaces inclined not more than 15° from the X-axis of the crystalline substance for operation with an electric field in the general direction of said X-axis, whereby said electroded section is piezoelectrically sensitive to a thickness-shear mode of motion.

6. A piezoelectric device comprising: a piezoelectrically sensitive section, cut from a single crystal isomorphic with, and containing at least a substantial portion of, ammonium pentaborate tetrahydrate, and which has a pair of electroded surfaces with the normal to the plane of each of said surfaces substantially coinciding with the X-axis of the crystalline substance.

7. A piezoelectric device comprising: a piezoelectrically sensitive section, cut substantially along natural cleavage planes from a single crystal isomorphic with, and containing at least a substantial portion of, ammonium pentaborate tetrahydrate, and which has a pair of electroded major surfaces with the normal to the plane of each of said surfaces substantially coinciding with the X-axis of the crystalline substance.

8. A piezoelectric device comprising: a section, cut from a single crystal isomorphic with, and containing at least a substantial portion of, ammonium pentaborate tetrahydrate, and which has a pair of electroded surfaces with the normal to the plane of each of said surfaces inclined not more than 15° from the Y-axis of the crystalline substance for operation with an electric field in the general direction of said Y-axis, whereby said electroded section is piezoelectrically sensitive to a thickness-shear mode of motion.

9. A piezoelectric device comprising: a piezoelectrically sensitive section, cut substantially along natural cleavage planes from a single crystal isomorphic with, and containing at least a substantial portion of, ammonium pentaborate tetrahydrate, and which has a pair of electroded major surfaces with the normal to the plane of each of said surfaces substantially coinciding with the Y-axis of the crystalline substance.

10. A piezoelectric device comprising: a piezoelectrically sensitive section, cut from a single crystal isomorphic with, and containing at least a substantial portion of, ammonium pentaborate tetrahydrate, and which has a pair of electroded surfaces with the normal to the plane of each of said surfaces substantially coinciding with the Z-axis of the crystalline substance.

11. A piezoelectric device comprising: a piezoelectrically sensitive resonator section having electroded major surfaces cut from a single crystal isomorphic with, and containing at least a substantial portion of, ammonium pentaborate tetrahydrate; and electrical circuit means for exciting said resonator section so as to utilize the frequency-selective characteristics thereof.

12. A piezoelectric device comprising: a piezoelectrically sensitive resonator section having electroded major surfaces cut from a single crystal isomorphic with, and containing at least a substantial portion of, ammonium pentaborate tetrahydrate; and electrical circuit means for exciting said resonator section in a thickness-shear mode of motion so as to utilize the frequency-selective characteristics of said mode of motion of said section.

13. A piezoelectric device for transducing between the types of energy which are classified as electrical and mechanical comprising: a piezoelectrically sensitive section cut from a single crystal isomorphic with, and containing at least a substantial portion of, ammonium pentaborate tetrahydrate; means for applying energy of one of said types to said crystal section; and means dependent upon the effect of said applied energy upon said crystal section for deriving and utilizing energy of said other type.

14. A piezoelectric device for transducing between the types of energy which are classified as electrical and mechanical comprising: a piezoelectrically sensitive section cut from a single crystal isomorphic with, and containing at least a substantial portion of, ammonium pentaborate tetrahydrate; means for applying energy of one of said types to said crystal section; and means dependent upon the effect of said applied energy upon said crystal section for deriving and utilizing energy of said other type, said mechanical energy being associated with motion of said crystal section in a thickness-shear mode.

LAWRENCE B. CHAMBERS.

REFERENCES CITED

The following references are of record in the file of this patent:

UNITED STATES PATENTS

| Number | Name | Date |
|---|---|---|
| 2,284,753 | Mason | June 2, 1942 |